(No Model.) 5 Sheets—Sheet 1.
E. R. DOWN.
APPARATUS FOR CURING MEATS.
No. 564,059. Patented July 14, 1896.
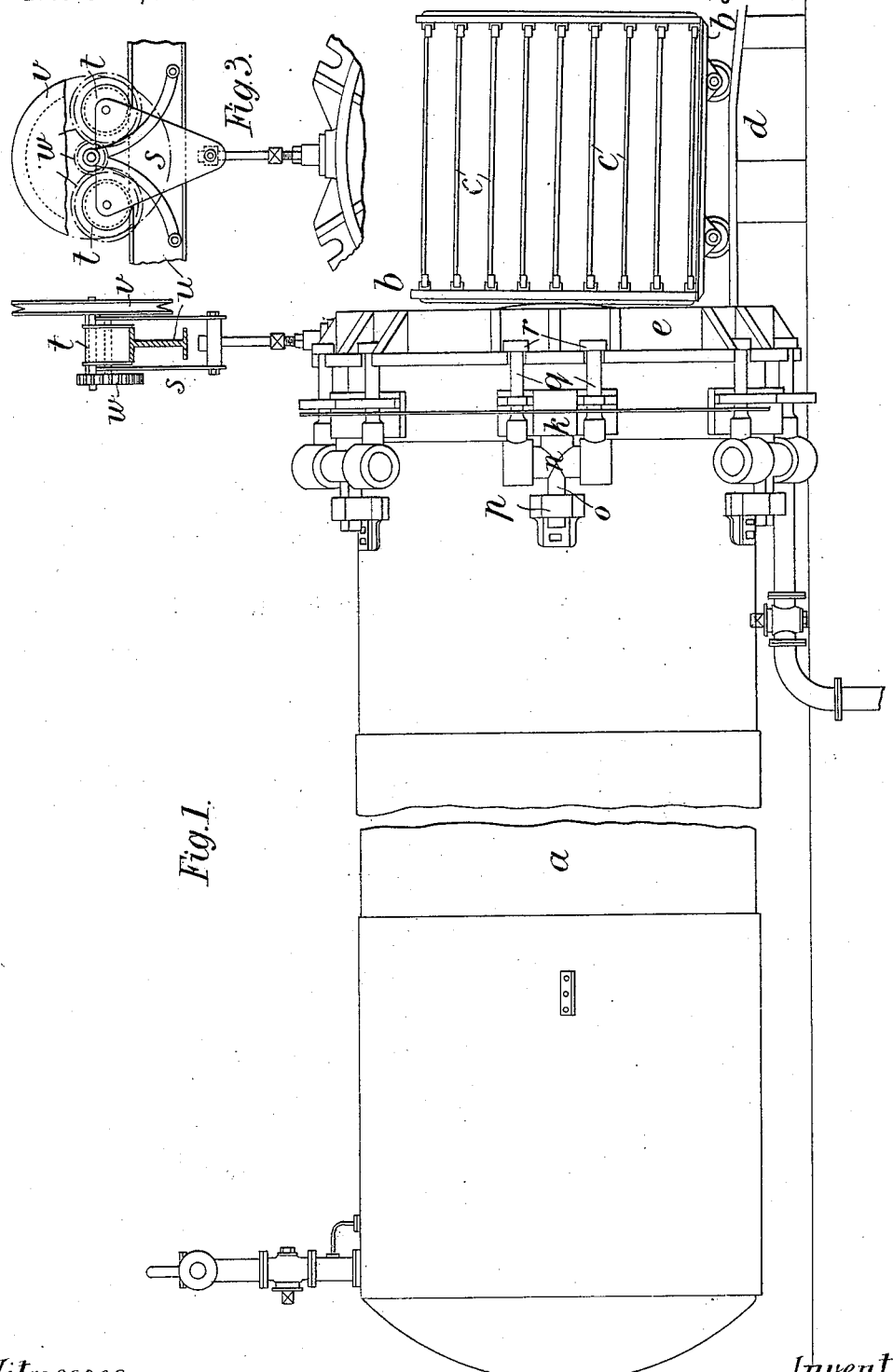
Witnesses.
J. D. Kingsbury
G. A. Tauberschmidt
Inventor.
Evan Roberts Down
By Whitaker Prevost Attys

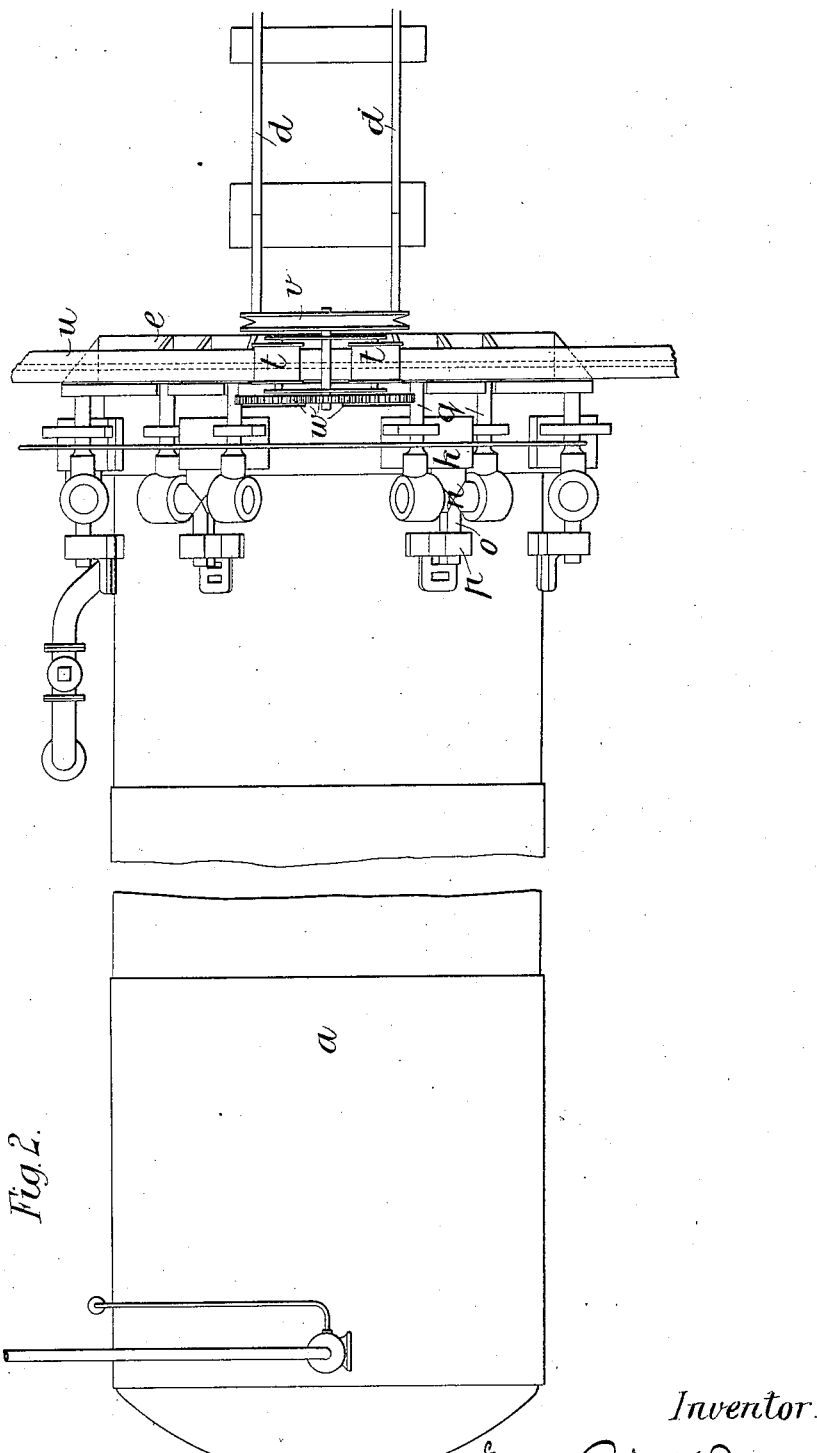

(No Model.) 5 Sheets—Sheet 3.
E. R. DOWN.
APPARATUS FOR CURING MEATS.
No. 564,059. Patented July 14, 1896.
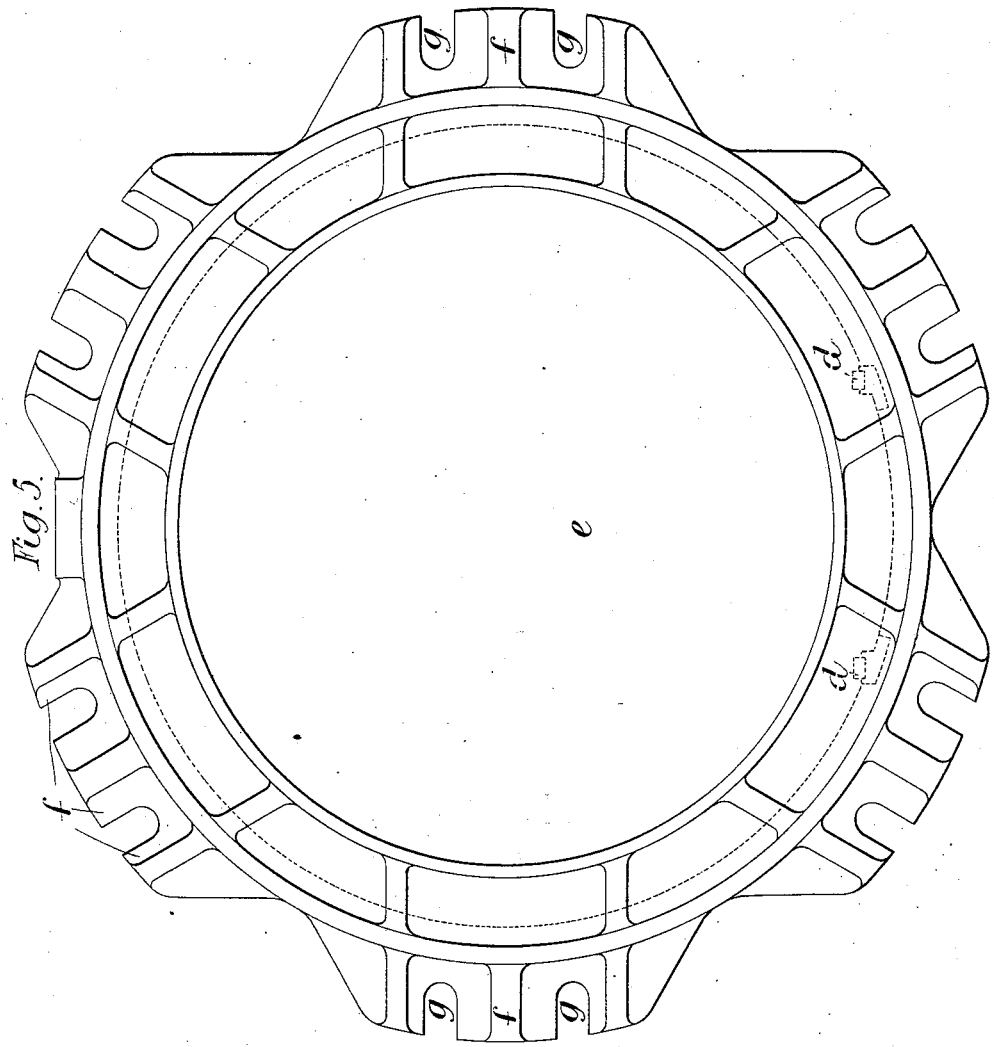
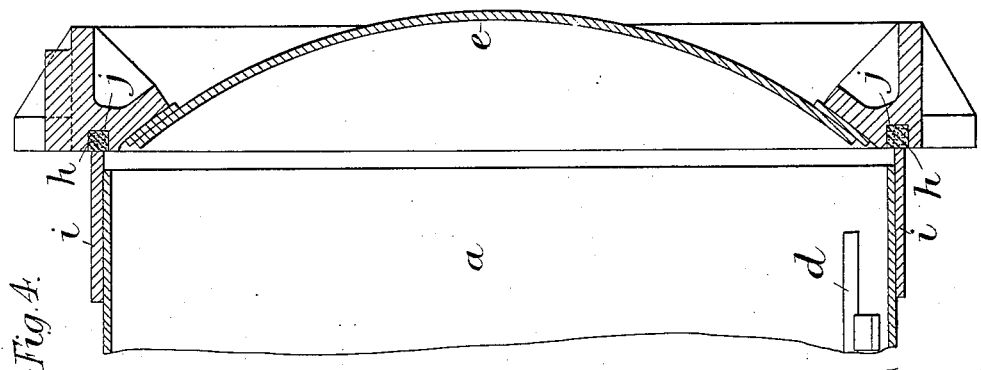
Witnesses. Inventor.

(No Model.) 5 Sheets—Sheet 4.
E. R. DOWN.
APPARATUS FOR CURING MEATS.
No. 564,059. Patented July 14, 1896.
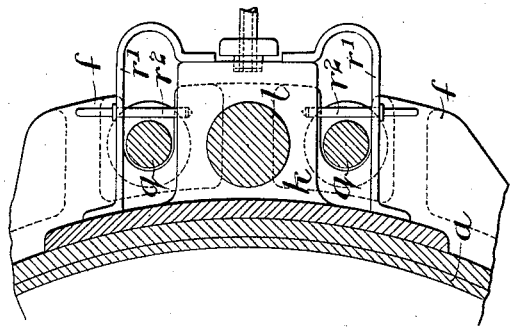
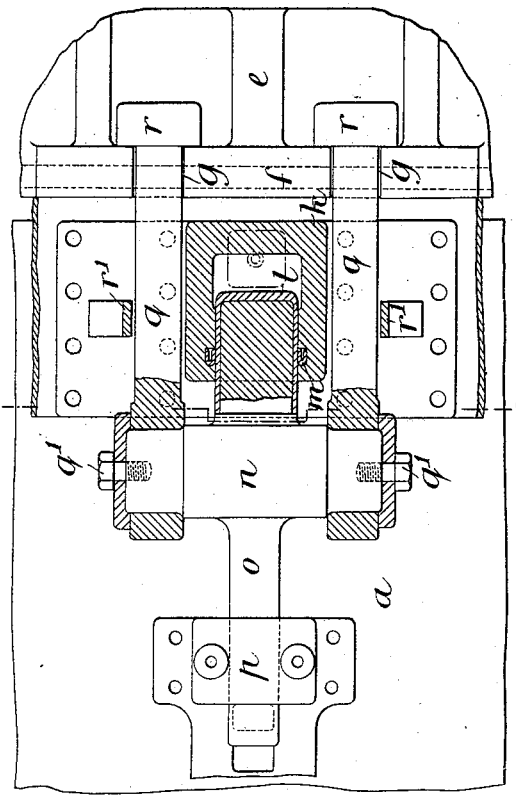
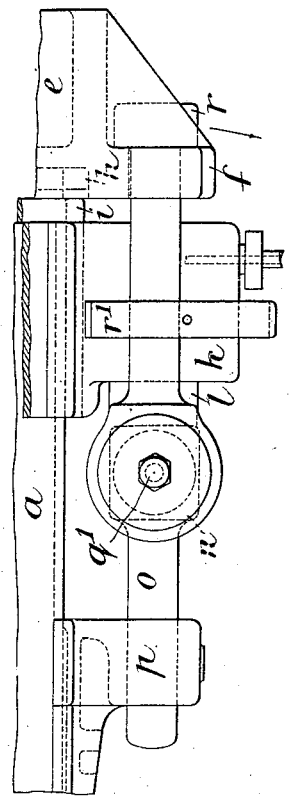
Witnesses.
J. D. Kingsbury
G. A. Tauberschmidt
Inventor
Evan Roberts Down
By Whitaker & Prevost
Attys

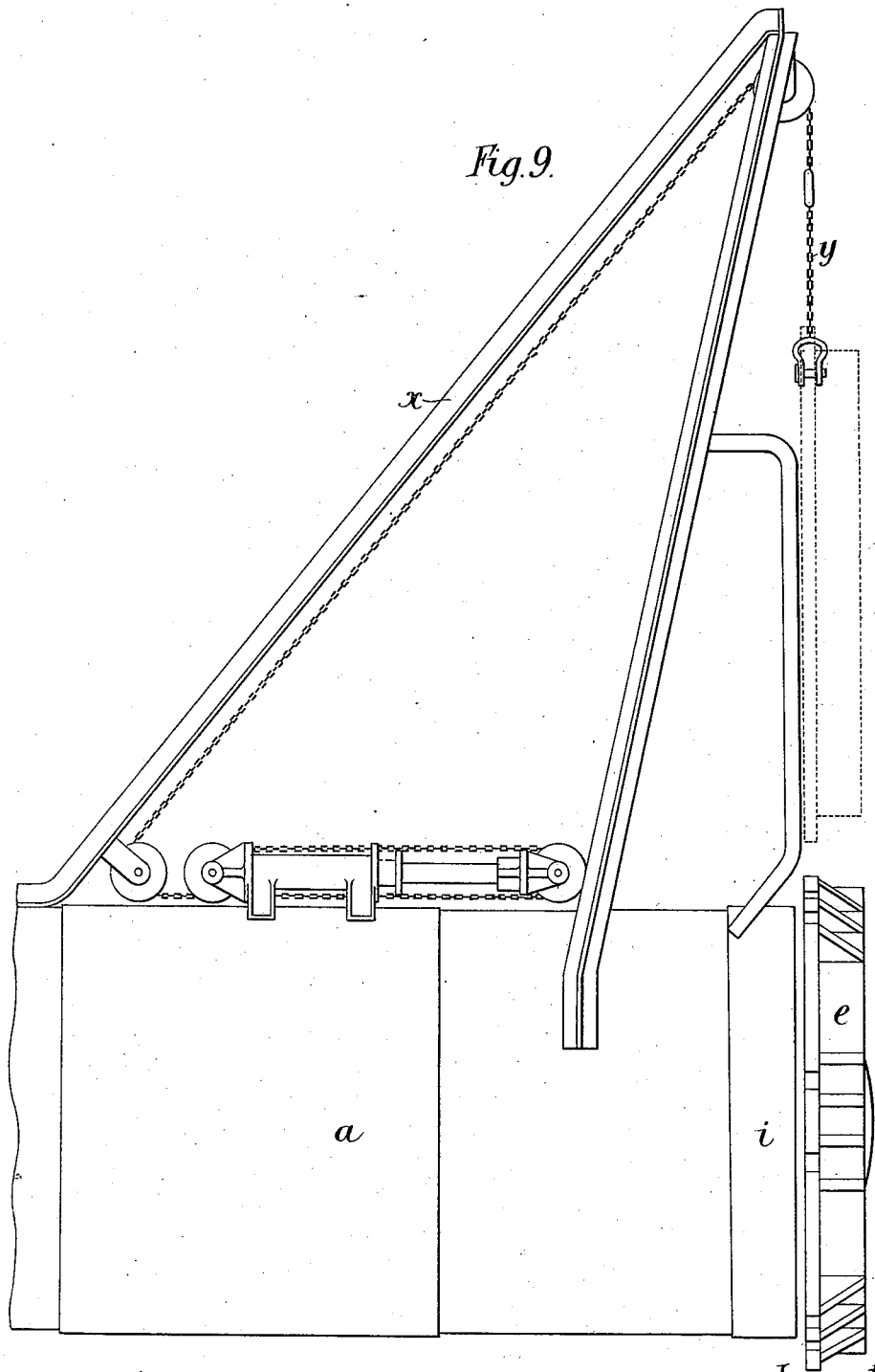

UNITED STATES PATENT OFFICE.

EVAN ROBERTS DOWN, OF GILLINGHAM, ENGLAND.

APPARATUS FOR CURING MEAT.

SPECIFICATION forming part of Letters Patent No. 564,059, dated July 14, 1896.

Application filed December 28, 1895. Serial No. 573,606. (No model.)

*To all whom it may concern:*

Be it known that I, EVAN ROBERTS DOWN, a subject of the Queen of Great Britain, residing at Gillingham, in the county of Dorset, England, have invented new and useful Improvements in Apparatus for Curing or Salting Bacon, Hams, and other Kinds of Meat, of which the following is a specification.

My invention relates to apparatus for curing bacon and hams, salting and preserving beef and other kinds of meat, and for similar purposes.

In carrying out my invention I inject brine into the sides or parts to be cured or salted by means of a syringe or its equivalent having a nozzle which penetrates to the required depth, then subject the parts so treated to a vacuum, and then introduce brine into the vacuum-chamber under atmospheric or other pressure, whereby the brine is caused to thoroughly impregnate the parts.

In order to facilitate the introduction and removal of the meat to be treated into the vacuum-chamber, I make the latter large enough to contain a truck or trucks, having removable trays upon which the meat is placed, and designed to run upon rails, which extend into the chamber.

In order that the door or cover which closes the end of the said chamber may be quickly secured with a hermetic joint, I provide for forcing or drawing the cover into tight contact with the adjacent joint-surface by hydraulic pressure, and I advantageously accomplish this by arranging behind the flange against which the cover joints a series of hydraulic rams, each of which carries a crosshead upon which is pivotally mounted a stirrup, the several stirrups being designed to enter slots in the cover and to engage therewith in such a manner that when the hydraulic rams are operated the stirrups will draw the cover firmly against the joint-surface.

To provide for rapidly moving the cover away from the opening in the vacuum-chamber, I sling the cover from an overhead carrier running upon a rail or rails, or I suspend the said cover form a crane, which is operated by a hydraulic ram upon the top of the vacuum-chamber.

To enable my invention to be fully understood, I will describe the same by reference to the accompanying drawings, in which—

Figure 1 is a side elevation of apparatus constructed according to my invention. Fig. 2 is a plan of the same. Fig. 3 is a front view of the carrier for moving the cover away from the opening in the chamber. Fig. 4 is a vertical section of the end of the vacuum-chamber and the door drawn to an enlarged scale. Fig. 5 is an elevation of the door. Fig. 6 is a plan partly in section, showing a hydyaulic ram for securing the door to the chamber. Fig. 7 is a side view of the hydraulic ram. Fig. 8 is a section on the line 8 8 of Fig. 6. Fig. 9 is a side elevation showing a hydraulic crane in position for raising the door or cover.

$a$ is the vacuum-chamber in which the sides or parts to be cured or salted are introduced after having had brine injected into them. $b$ is a truck provided with removable trays $c$ $c$ to receive the sides or parts to be cured, and $d$ $d$ are the rails which extend into the chamber $a$ and upon which the truck or trucks runs or run.

One end of the vacuum-chamber $a$ is permanently closed, the other end being temporarily closed by means of the door $e$. Around the periphery of the said door $e$ are arranged a number of lugs $f f$, each lug having formed in it two slots $g$ $g$. The inner face of the door or cover $e$ is provided with a circular recess $h$, into which the projecting end of a ring $i$ on the end of the vacuum-chamber $a$ is designed to pass when the door is placed in position for closing the said chamber. Suitable packing $j$ is provided in the circular slot for making a tight joint.

The hydraulic-ram cylinders $k$ are riveted or otherwise suitably attached to the chamber $a$.

$l l l$ are the rams working in the cylinders $k$ $k$. Each ram $l$ is packed with a cup-leather $m$ in the ordinary manner, and at its outer end is rigidly attached to a cross-head $n$, provided with a guide-rod $o$, working in a guide $p$, secured to the vacuum-chamber $a$.

$q$ $q$ are links forming the stirrup and pivotally mounted upon the cross-head, to which they are connected by means of the screws $q'$ $q'$, the said links being formed at their free ends with heads $r$ and being designed to enter into the slots $g\ g$ in the lugs $f$ on the door or plate $e$ and to pull the door or cover, by means of the heads, into tight contact with the vacuum-chamber when the ram is forced outward.

$r'\ r'$ are bars attached to the cylinders $k$ for limiting the movement of the links $q\ q$ on the cross-head, and $r^2\ r^2$ are pins which pass through holes in the said bars into holes in the cylinders $k$ for preventing the links $q$ from accidentally leaving the slots $g$.

The rams are all connected to a single source of pressure and are actuated simultaneously.

To provide for rapidly moving the cover $e$ away from the vacuum-chamber $a$ when the links $q$ have been removed from the slots $g$, I sling the same to the overhead carrier $s$, the said carrier being provided with rollers $t\ t$, adapted to run on the rail $u$. The carrier can be set in motion by means of the pulley $v$ and gearing $w$.

Fig. 9 shows an alternative device for removing the cover. This device consists of a hydraulic crane $x$, mounted on the top of the vacuum-chamber $a$, the cover $e$ being suitably connected to the chain $y$ of the crane.

The chamber is provided with an inlet and outlet for the brine and is connected to suitable apparatus for producing the vacuum, and with means for subjecting the brine to pressure.

The process is as follows: The sides or parts to be cured, which have been treated with brine injections, as above described, are placed on the trays $c\ c$ of the truck or trucks $b$, which is or are then run into the chamber $a$. The door $e$ is then placed in position over the opening and the links $q\ q$ are placed in the slots $g\ g$ in the lugs $f$ of the door $e$ and retained there by the pins $r^2\ r^2$, and the rams $l$ are then forced outward, whereby the door $e$ is pulled against the end of the cylinder $a$, so as to cause the ring $i$ to enter the recess $h$ in the cover $e$, thereby making a hermetic joint. The chamber is then exhausted of air, so as to cause the sides or parts to give up the free gases they contain, and afterward filled with brine, which is subjected to atmospheric or other pressure and forced into the pores of the sides, so as to thoroughly impregnate the same. When the operation of impregnation is finished, the brine is run off and the rams are relieved from pressure, thereby enabling the links $q\ q$ to be removed from the slots $g\ g$, so that the door can be moved from the front of the opening in the chamber $a$ by means of the carrier $s$ or the crane $x$, and the truck or trucks containing the cured sides or parts is or are then run out from the chamber.

Having now particularly described and ascertained the nature of my said invention and in what manner the same is to be performed, I declare that what I claim is—

1. The combination with the inclosing casing, of a door adapted to engage one end of the same, a series of hydraulic rams, secured to said casing and provided with securing devices for engaging the said door, substantially as described.

2. The combination with the inclosing casing, of a door adapted to engage one end of the same, a series of hydraulic rams, secured to said casing at different points around the same, pivoted securing devices connected with said rams for engaging the said door and means for controlling all of said rams simultaneously, substantially as described.

3. The combination with the inclosing casing, of a door adapted to engage one end of the same, a series of hydraulic rams secured to said casing at different points about the same, each provided with pivoted securing devices for engaging said cover, and removable retaining-pins for preventing disengagement of the securing devices from said cover, substantially as described.

EVAN ROBERTS DOWN.

Witnesses:
JOHN E. BOUSFIELD,
G. F. TYSON.